United States Patent Office 3,211,674
Patented Oct. 12, 1965

3,211,674
POLYURETHANE FOAM FROM HYDROXYLATED TALL OIL
Robert L. Sandridge, Proctor, W. Va., assignor to Mobay Chemical Company, Pittsburgh, Pa., a corporation of Delaware
No Drawing. Filed Aug. 22, 1961, Ser. No. 133,033
4 Claims. (Cl. 260—2.5)

This invention relates to polyurethane plastics and more particularly to polyurethane plastics which are based on relatively inexpensive resinous components and organic polyisocyanates.

The incorporation of drying oils into polyurethane plastics has become a well-developed art. Castor oil, for example, is well known for reaction with organic polyisocyanates to prepare polymers which are useful as coatings, for the production of foamed plastics, elastomers and the like. It has also been proposed to use fatty acids and/or rosin acids for the production of polyurethane plastics either as reactants or as an inert ingredient. Tall oil is an example of a mixture of fatty acids and rosin acids. Heretofore, if the tall oil was to be reacted with the organic polyisocyanate, it was first alcoholized by esterifying it with a polyhydric alcohol, for example, pentaerythritol and the like. If the unmodified tall oil is used, for example, in the production of a foam or a coating, it must be used in conjunction with some more reactive component such as a polyhydric polyalkylene ether or hydroxyl polyester in order to build a useful polymer and the tall oil in this system acts as a filler. Where the tall oil esters are used, the production thereof is expensive and causes an increase in the cost of the final product.

It is, therefore, an object of this invention to provide improved polyurethane plastics based on unsaturated fatty acids and/or rosin acids. Another object of this invention is to provide a method of modifying unsaturated fatty acids and/or rosin acids and particularly tall oil to make it suitable for reaction with organic polyisocyanates to prepare polyurethane plastics. A further object of this invention is to provide improved cellular polyurethane plastics which are based on tall oil. A more specific object of this invention is to provide rigid polyurethane plastics based on tall oil. Another object of this invention is to provide coating compositions and substrates coated therewith which are based on tall oil reacted with organic polyisocyanates to prepare polyurethane plastics. A further object of this invention is to provide products which are curable with either organic cross-linking agents or water to prepare useful polyurethane plastics and particularly polyurethane plastics which may be either porous or non-porous. A further object of this invention is to provide polyurethane elastomers prepared from tall oil.

The foregoing objects and others which will become apparent from the following description are accomplished in accordance with the invention, generally speaking, by providing polyurethane plastics prepared by a process which comprises reacting an organic polyisocyanate with an hydroxylated fatty acid and/or rosin acid which has been prepared by selectively oxidizing an unsaturated oil. The invention is particularly applicable to the production of polyurethane plastics from tall oil which has been modified to contain free hydroxyl groups. This modification takes place by causing the unsaturation in the fatty acid and/or rosin acid to react with an oxidizing agent such as, for example, hydrogen peroxide, hypohalous acids such as hypochlorous acid, cold alkaline potassium permanganate, peracetic acid or perbenzoic acid with subsequent hydrolysis, or other mild oxidizing agent which will introduce hydroxyl groups into the molecule through the ethylenic unsaturation. It is advantageous to use these hydroxylated fatty acids and/or rosin acids for the production of polyurethane plastics and particularly for the production of rigid cellular polyurethane plastics because they are of low cost and have improved heat resistance. The preparation of rigid cellular polyurethane plastics is a preferred embodiment of this invention and particularly where tall oil has been hydroxylated and then reacted with unrefined organic polyisocyanate containing from about 30 percent to about 85 percent diisocyanate with about 70 to about 15 percent polyisocyanate containing more than two —NCO groups per molecule.

Any suitable organic polyisocyanate may be used in the process of the present invention including aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene disocyanate, 3,3'-dichloro-4,4'-biphenylene diisocyanate, p,p',p''-triphenylmethane triisocyanate, 1,5-naphthalene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene disocyanate, 1,5-naphthalene diisocyanate and the like. It is preferred to use the commercially available mixture of toluylene diisocyanates which contains 80 percent 2,4-toluylene diisocyanate and 20 percent 2,6-toluylene diisocyanate or 4,4'-diphenylmethane disocyanate for most processes but some particular processes like the production of rigid cellular polyurethane plastics preferably employ other isocyanates as more particularly disclosed elsewhere in this application.

Any suitable hydroxylated fatty acid and/or rosin acid may be used. The hydroxylated fatty acids and/or rosin acids are prepared as pointed out above by reaction of the unsaturated oil with a mild oxidizing agent to introduce hydroxyl groups at the double bond. The unsaturated fatty acids and/or rosin acids are, for example, fatty acids such as delta-9-decylenic acid, stillingic acid, delta-9-dodecylenic acid, palmitoleic acid, oleic acid, ricinoleic acid, petroselinic acid, vaccenic acid, linoleic acid, linolenic acid, eleostearic acid, licanic acid, parinaric acid, gadoleic acid, arachidonic acid, cetoleic acid, erucic acid, selacholeic acid or nervonic acid, rosin acids such as, for example, abietic acid, levopimaric acid, d-pimaric acid, neoabietic acid, dihydroabietic acid and the like and it is preferred to use that mixture of fatty acids and/ or rosin acids known as tall oil. The term "tall oil" as used herein and in the claims designates the resinous substance obtained as a waste product in the manufacture of cellulose from pine wood. The composition of the tall oil and its properties are preferably within the following ranges.

| | | |
|---|---|---|
| Density | | 0.95–1.02 |
| Acid number | | 107–174 |
| Iodine number | | 120–180 |
| Ash | percent | 0.4–4.6 |
| Moisture | do | 0.39–1.0 |
| Insoluble (petroleum ether) | do | 0.1–8.5 |
| Fatty acids | do | 18–99 |
| Rosin acids | do | 0.5–80 |
| Nonacid bodies | do | 5–24 |
| Viscosity: | | |
| At 18° C. | cp | 760–15×10$^6$ |
| At 100° C. | cts | 150–1200 |

A preferred tall oil has the approximate composition:

| | | |
|---|---|---|
| Rosin acids | percent | 20–30 |
| Fatty acids | do | 50–60 |
| Unsaponifiables | do | 15–25 |
| Acid number | | 105–125 |
| Saponification No. | | 130–160 |
| Iodine number | | 130–160 |

The oxidation of these unsaturated fatty acids and/or rosin acids may be carried out in a straightforward and convenient manner. Oxidation with hydrogen peroxide without a catalyst or in the presence of a catalyst such as tungstic acid, osmic acid, phosphotungstic acid and the like is a convenient way of hydroxylating them but they may also be oxidized with ozone, hypohalous acids, alkaline potassium permanganate and the like. The extent of the oxidation can be determined by following the hydroxyl number and the acid number of the product. The oxidation should be continued until an hydroxyl number of at least about 20 is obtained and products which have an hydroxyl number of from about 50 to about 600 are preferred. The oxidation should not be continued long enough or vigorously enough to cause the production of an excessive number of acid groups. Consequently, when the hydroxyl numbers are within the ranges desired, the reaction should be terminated to prevent excessive change in the acid number. A proper choice of starting components coupled with very mild oxidizing conditions will yield satisfactory resinous materials for the production of elastomers, coatings and the like and other non-porous polyurethane plastics. Tall oil is especially suitable for this purpose. In accordance with a preferred embodiment of the invention, tall oil is partially hydroxylated so as to introduce hydroxyl groups without the introduction of carboxyl groups.

The invention is generally applicable to the production of polyurethane plastics and in accordance with the invention, one may produce coatings, castings and the like which may be either porous or non-porous.

The process of the invention comprises mixing an organic polyisocyanate with the hydroxylated fatty acid and/or rosin acid and allowing these components to react to prepare a polyurethane plastic. If cellular polyurethane plastics are desired and if the hydroxylated fatty acid and/or rosin acid does not contain sufficient carboxyl groups to generate carbon dioxide and cause the expansion of the polymer into a cellular structure, then it is necessary to have a blowing agent. The blowing agent may be water which will react with organic polyisocyanates to produce carbon dioxide, or on the other hand, one may employ a compound which is volatile at the reaction temperature such as a halohydrocarbon, for example, dichlorodifluoromethane, trichlorofluoromethane and the like.

It is often advantageous in the production of cellular polyurethane plastics to include other additives in the reaction mixture such as, for example, emulsifiers, foam stabilizers, coloring agents, and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. It is preferred to employ a silicone oil of the above patent within the scope of the formula

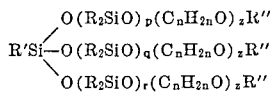

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

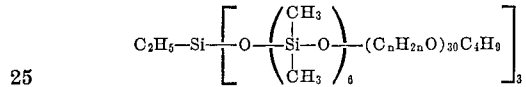

wherein $(C_nH_{2n}O)$ is a mixed polyoxyethylene and oxypropylene block copolymer containing about 17 oxyethylene units and about 13 oxypropylene units.

It is preferred to include a catalyst in the reaction mixture leading to the production of the cellular polyurethane plastics. Suitable catalysts are, for example, tertiary amines, such as, for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine and the like. Other suitable catalysts are, for example, molybdenum glycollate, tin compounds such as stannous chloride, tin salts of carboxylic acids, such as dibutyl tin di-2-ethyl hexoate, stannous octoate, as well as other organo metallic compounds such as are disclosed in U.S. Patent 2,846,408.

The process of the invention can also be used for the preparation of castings, moldings and coating compositions including, for example, caulks, sealants, putties, adhesives and surface coatings. In many of these applications as well as in the production of some cellular polyurethane plastics it is advantageous to prepare a prepolymer which has free isocyanato groups from an excess of organic polyisocyanate and hydroxylated fatty acid and/or rosin acid and then react the preporlymer with a cross-linking agent such as water for the preparation of cellular polyurethane plastics or an organic chain-extending agent such as a polyhydric alcohol, polyamine or an amino alcohol which contains only free hydroxyl groups or both free hydroxyl groups and free primary amino groups for the production of non-porous polyurethane plastics. Moreover, the prepolymer may be further reacted with a chain-extending agent to form a crumbly mass which may then be placed into a mold, and heated with shaping to form a cured product. Still another method of carrying out the present invention to prepare polyurethane plastics which are non-porous is to prepare a prepolymer and partially cure it with an organic chain-extending agent to prepare a mass which may be molded under pressure, extruded and the like.

Castings are prepared by mixing either a monomeric organic polyisocyanate or the above-described prepolymer containing free isocyanato groups with an organic cross-linking agent preferably under substantially anhydrous conditions and casting the resulting mixture in a mold. Suitable organic cross-linking agents of the class described above are ethylene glycol, propylene glycol, 1,4-butane diol, 1,3-pentane diol, glycerine, trimethylolpropane, pentaerythritol, ethylene diamine, propylene diamine, 1,4-butane diamine, 1,3-butane diamine, ethanol amine, butanol amine, bis-beta-hydroxy ethylene diamine, N,N,N',N'-tetrakis(2-hydroxy propyl)ethylene diamine, the bis-beta-hydroxy ethyl ether of hydroquinone and the like.

In accordance with another embodiment of the invention, moldings are prepared by reacting the organic polyisocyanate with the hydroxylated fatty acid and/or rosin acid in a kneader or other suitable mixing device to obtain a crumbly mass which is then further reacted with an organic polyisocyanate, polyamine, water or other suitable cross-linking agent on a rubber mill and finally pressed in a mold and allowed to cure. Suitable processes for carrying out this type of reaction may be found in U.S. Patents 2,621,166 and 2,900,368.

Coating compositions may be prepared by reacting an organic polyisocyanate or isocyanato modified prepolymer as described above with the hydroxylated fatty acid and/or rosin acid in an inert organic solvent therefor. Any suitable inert organic solvent may be used such as, for example, xylene, ethyl acetate, toluene, ethylene glycol monoethyl ether acetate and the like. The resulting coating composition can be applied in any suitable fashion as by dipping, brushing, roller coating and the like, but is preferably applied by spraying onto the substrate. Any siutable substrate may be coated with the coating compositions of the invention such as, for example, wood, paper, porous plastics, such as, for example, sponge rubber, cellular polyurethane plastics, foamed polystyrene and the like as well as metals such as steel, aluminum, copper and the like. The coating composition need not contain a solvent for all applications. The coating composition of the invention may contain any suitable pigment such as, for example, iron oxide, carbon black, titanium dioxide, zinc oxide, chrome green, lithol red and the like. Flexible, chemically resistant coatings are obtained in accordance with the process of the invention. The coating compositions can also be used as adhesive in accordance with the present invention by applying the coating composition to a substrate to be bonded.

The products of the invention are useful for the preparation of both sound and thermal insulation and for the preparation of solid plastics including gear wheels and the like. The coating compositions may be used for coating substrates such as wood, metal such as steel, and the like.

The invention is further illustrated by the following examples in which the parts are by weight unless otherwise indicated.

Example 1

About 800 grams of tall oil fatty acids having the following analysis: acid number 196, hydroxyl number 0, iodine number 130.2, are charged into a 3 liter three neck round bottom flask equipped with a stirrer, a thermometer and a combined dropping funnel and reflux condenser. About 0.001 percent by weight tungstic acid is added to the tall oil fatty acids in the flask and the mixture is heated and stirred until the pot temperature is about 52° C. Then about 440 ml. of 35 percent aqueous solution of $H_2O_2$ are added dropwise at the rate of about 75 ml. per hour with continuous heating sufficient to maintain the temperature between about 60 and about 75° C. throughout the addition. After the addition is complete, the heating and stirring are continued for an additional six hours. The reaction mixture is then allowed to cool to room temperature. A two phase mixture consisting of an aqueous layer and an organic layer is obtained, the organic layer being the top layer. The aqueous layer is drained from the organic layer. The organic layer is then mixed with granular anhydrous $CaSO_4$ to remove residual water. The dry organic layer has the following chemical analysis: acid number 196, hydroxyl number 250, iodine number 77.1. This indicates that the tall oil has been only partially hydroxylated and that the conditions were maintained so that the acid number remains substantially unchanged.

About 100 parts of this modified hydroxylated tall oil are then combined with about 112 parts of an unrefined mixture of organic polyisocyanates obtained by the phosgenation of the crude reaction product of aniline and formaldehyde which has about 29.5 percent —NCO, about 0.2 part of stannous octoate, about 0.2 part of N,N,N',N'-tetramethyl-1,3-butane diamine, about 1 part of silicone oil having the formula

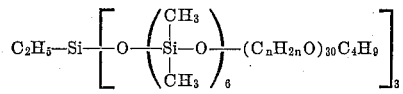

wherein $(C_nH_{2n}O)$ is a mixed polyoxyethylene and oxypropylene block copolymer containing about 17 oxyethylene units and about 13 oxypropylene units and about 25 parts of dichlorodifluoromethane on a machine mixer as disclosed in U.S. Reissue Patent 24,514. The resulting rigid foam has a density of about 2 lbs./ft.³

Example 2

About one kilogram of a tall oil fatty acid having the following analysis: acid number 200, hydroxyl number 0, iodine number 135 is put in a three-necked flask equipped with a thermomenter, a dropping funnel and stirrer. About 890 ml. of deionized water is added and the mixture is heated to about 60° C. with agitation. About 500 ml. of approximately a 35 percent hydrogen peroxide solution is added dropwise to the mixture over approximately a one-hour period with constant agitation of the two-phase system. The temperature is maintained at about 60 to 90° C. for approximately an additional four hours at which time about 5 grams of sodium tungstate are added as a catalyst. Heating and stirring is continued for approximately an additional 12 hours during which time the oily layer is tested with potassium iodate for the presence of peroxide. The mixture is then cooled, the oily layer separated from the aqueous phase and dried by adding benzene to the mixture and removing the benzene-water azeotrope by distillation. The analysis of the final product was as follows: acid number 149.4, hydroxyl number 181.6. About 200 grams of this resin were mixed with about 50 grams of fluorotrichloromethane, about 2 grams of silicone oil described in Example 1, about 1 gram of stannous oleate and about 1 gram N-ethyl morpholine. About 166 grams of an unrefined polyisocyanate such as described in Example 1 were added to the above mixture with rapid agitation and then poured into a mold where foaming occurred. The resulting product was a rigid foam of about 2.0 lbs./ft.³ density which was relatively brittle but which did not soften appreciably at temperatures up to about 140° C.

Example 3

About 125 parts of the hydroxylated tall oil resin de scribed in Example 1 were mixed with about 43 parts of ethylene glycol monoethyl ether acetate and about 43 parts of xylene. To this mixture were added about 444 parts of a polyisocyanate solution comprised of about 177.6 parts of a polyisocyanate which is the reaction product of trimethylolpropane and 80 percent 2,4-toluylene diisocyanate and 20 percent 2,6-toluylene diisocyanate. The pot life of the coating mixture is about 16 hours. Approximately 3 mil wet film was spread on a 30 gauge steel panel and allowed to air dry over night. The cured film was hard, resistant to abrasion, impact and water.

Example 4

About 100 grams of the resin described in Example 2 are mixed with about 51 grams of 80 percent 2,4-toluylene diisocyanate and 20 percent 2,6-toluylene diisocyanate. Gas evolution and boiling continues vigorously for about 5 minutes. After the gas evolution subsides, the mixture is stirred until it has the appearance of creamy paste. The mixture, now warmed by its own exotherm, is put in a mold and allowed to cure for 24 hours. The resulting product is a rigid non-cellular plastic of about 30 lbs./cu. ft. density.

*Example 5*

About 100 grams of the resin described in Example 4 are combined with about 25 grams trichlorofluoromethane, 0.2 gram N,N,N',N'-tetramethyl butane diamine, 0.2 gram stannous octoate and 1 part of the silicone used in Example 1. About 46 grams of the polyisocyanate employed in Example 1 are mixed into the above and the foam mix poured into a mold. Rigid foam having a density of about 2.0 lbs./cu. ft. results.

*Example 6*

About 1000 grams of a tall oil fatty acid having an acid number of about 200, and an iodine number of about 130 and essentially no hydroxyl content are treated with an alkaline solution of chlorine untitl the hydroxyl number has increased to about 150 and the chlorine content is about 9 percent by weight. About 100 grams of this resin are mixed with about 25 grams trichlorofluoromethane, about 1.0 gram of the silicone oil of Example 1, about 0.2 gram stannous octoate and about 5 parts antimony trioxide, reacted with about 55 grams of 80 percent 2,4-toluylene diisocyanate and 20 percent 2,6-toluylene diisocyanate and poured into a mold to cure. The resulting cellular product is a rigid foam of about 2 lbs./cu. ft. density which is self-extinguishing after being ignited.

*Example 7*

About 100 parts of a tall oil having an hydroxyl number of about 250, an acid number of about 159, a water content of about 1.1 percent, a saponification number of about 194 and an iodine number of about 19 are blended with about 1.5 parts of a siloxane oxyalkylene block copolymer having the formula

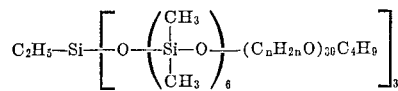

wherein $(C_nH_{2n}O)$ is a mixed polyoxyethylene and oxypropylene block copolymer containing about 17 oxyethylene units and about 13 oxypropylene units, about 0.4 parts of stannous octoate and about 25 parts of trichlorofluoromethane. Then about 63.2 parts of a mixture of 80 percent 2,4-toluylene diisocyanate and 20 percent 2,6-toluylene diisocyanate are added and this is mixed for about 20 seconds and poured into a cardboard box. The foaming reaction takes approximately 2 minutes. The foam is cured overnight at a temperature of about 150° C. in a circulating air oven. The product is a rigid polyurethane foam having a density of about 0.85 lb./cu. ft. and a yield strength of about 4 lbs./in.$^2$.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A rigid cellular polyurethane plastic prepared by a process which comprises reacting, in the presence of a blowing agent, an organic polyisocyanate with tall oil which has been hydroxylated by reaction with an oxidizing agent until it has an hydroxyl number of at least about 50, said organic polyisocyanate having been prepared by a process which comprises phosgenating the reaction product of aniline with formaldehyde.

2. The rigid cellular polyurethane plastic of claim 1 wherein said organic polyisocyanate is a mixture comprising from about 30 to about 85 percent of an organic diisocyanate and the balance higher organic polyisocyanates.

3. The rigid cellular polyurethane plastic of claim 1 wherein said cellular polyurethane plastic is prepared by reacting said organic polyisocyanate with said hydroxylated tall oil in the presence of a silicone oil having the formula

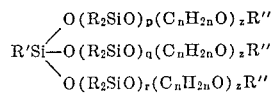

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34 and a catalyst selected from the group consisting of a tertiary amine and an organo metallic compound.

4. The rigid cellular polyurethane plastic of claim 3 wherein said organo metallic compound is a tin salt of a carboxylic acid.

References Cited by the Examiner

UNITED STATES PATENTS

| | | | |
|---|---|---|---|
| 2,361,793 | 10/44 | Porter et al. | 260—406 |
| 2,787,601 | 4/57 | Detrick et al. | 260—404.5 |
| 2,812,337 | 11/57 | Culemeyer | 260—18 |
| 2,968,575 | 1/61 | Mallonee | 260—75 |
| 3,039,976 | 6/62 | Barnes et al. | 260—18 |
| 3,079,641 | 3/63 | Knox et al. | 260—2.5 |
| 3,095,386 | 6/63 | Hudson | 260—18 |

FOREIGN PATENTS 776,757   6/57   Great Britain.

MURRAY TILLMAN, *Primary Examiner.*

WILLIAM H. SHORT, *Examiner.*